United States Patent
Deolalikar et al.

(10) Patent No.: US 9,576,027 B2
(45) Date of Patent: Feb. 21, 2017

(54) GENERATING A QUERY PLAN FOR ESTIMATING A NUMBER OF UNIQUE ATTRIBUTES IN A DATABASE

(75) Inventors: Vinay Deolalikar, Cupertino, CA (US); Choudur Lakshminarayan, Austin, TX (US); Hernan Laffitte, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2373 days.

(21) Appl. No.: 12/258,741

(22) Filed: Oct. 27, 2008

(65) Prior Publication Data

US 2010/0114869 A1    May 6, 2010

(51) Int. Cl.
*G06F 17/30* (2006.01)

(52) U.S. Cl.
CPC ... *G06F 17/30463* (2013.01); *G06F 17/30433* (2013.01)

(58) Field of Classification Search
CPC .................. G06F 17/30433; G06F 17/30463; G06F 17/30442; G06F 17/30471
USPC ........ 707/706, 713, 714, 718, 727, 736, 767
See application file for complete search history.

(56) References Cited

U.S. PATENT DOCUMENTS

| | | | |
|---|---|---|---|
| 6,263,345 B1 | 7/2001 | Farrar et al. | |
| 6,272,487 B1 | 8/2001 | Beavin et al. | |
| 6,477,534 B1 | 11/2002 | Acharya et al. | |
| 6,839,680 B1 | 1/2005 | Liu et al. | |
| 7,010,516 B2 | 3/2006 | Leslie | |
| 7,363,289 B2* | 4/2008 | Chaudhuri et al. | |
| 2003/0084043 A1 | 5/2003 | Acharya et al. | |
| 2003/0101449 A1 | 5/2003 | Bentolila et al. | |
| 2006/0047683 A1* | 3/2006 | Lakshminarayan et al. . | 707/102 |
| 2008/0126176 A1 | 5/2008 | Iguchi | |

OTHER PUBLICATIONS

Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: The Collective Intelligence Platform, Online, http://www.baynote.com/technology/platform/ 2010.

(Continued)

*Primary Examiner* — James Trujillo
*Assistant Examiner* — Fariborz Khoshnoodi
(74) *Attorney, Agent, or Firm* — Hewlett Packard Enterprise Patent Department

(57) ABSTRACT

In a method for generating a query plan for estimating a number of unique entry counts of an attribute in a database, a sample of entries in the database is identified, at least one of a sampling percent and a coefficient of variance of the entries in the sample is identified, and a skewness of the entries in the sample is calculated. In addition, at least one of a plurality of estimators is selected based upon the skewness of the entries and at least one of the sampling percent and the coefficient of variance of the entries in the sample. Moreover, a query plan is generated from the selected at least one of the plurality of estimators. A query optimizer for performing the method is provided.

15 Claims, 5 Drawing Sheets

(56) References Cited

OTHER PUBLICATIONS

Hottolink Inc.; "Recognize" Online, http://www.hottolink.co.jp/english/reconize.html, 2009.
Andrejko et al.: User Characteristics Acquisition from Logs with Semantics 8. Slovak University of Technology in Bratislava, 2007.
Hongjun Lu et al: Extending a Web Browser with Client-Side Mining, Hong Kong University of Science and Technology Department of Computer Science, Clear Water Bay, Kowloon, Hong Kong, China, 2003.
Shankar et al.; "Personalized Web Search Based on Client Side Ontology", CS 498: B.Tech Project, 10. IIT Kanpur, India 2010.
Sendhikumar et al.; "Personalized ontology for web search personalization" 1. Anna University, Chennai, India , 2008.
Shahabi et al.; "Yoda an Accurate and Scalable Web based Recommendation System?" University of Southern California, Los Angeles, Sep. 2001.
Why Wubat? Website User Behavior & Analysis Tool, Wubat, Online, http://www.wubat.com/, 2006.
Claypool et al.; "Implicit Interest Indicators", 14. Worcester Polytechnic Institute, Worcester, Computer Science Department Worcester Polytechnic Institute Worcester, MA 01609, USA., 2001.
Shahabi et al.; A Framework for E±cient and Anonymous Web Usage Mining Based on Client-Side Tracking, 15. University of Southern California, Los Angeles, 2002.
Chattertrap; Online http://www.chattertrap.com; Jul. 20, 2010.
HSNW: SRI defense technology spawns civilian application: published Jun. 29, 2010.
Anthony Ha: Facebook investor backs Chattertrap, a personal assistant for content, Jun. 28, 2010.
Haas, P. J. et al., Sampling-Based Estimation of the Number of Distinct Values of an Attribute, Proc. of the 21st VLDB Conf., Switzerland, 1995.

\* cited by examiner

ESTIMATOR DIAGRAM 300

FOR POPULATION SIZES > 50 M

| SAMPLING PERCENT SKEWNESS | SAMPLING < 0.9% | SAMPLING ≥ 0.9% |
|---|---|---|
| SKEWNESS < 4 | $\dfrac{\text{OPTIMAL + JACKKNIFECLOSER}}{2}$ | $\dfrac{\text{OPTIMAL + JACKKNIFECLOSER}}{2}$ |
| 4 ≤ SKEWNESS < 13 | OPTIMAL | OPTIMAL |
| 13 ≤ SKEWNESS < 30 | $\dfrac{\text{OPTIMAL + ADAPTIVE}}{2}$ | SCHLOSSERCLOSER |
| SKEWNESS ≥ 30 | | |

*FIG. 3A*

ESTIMATOR DIAGRAM 320

FOR SAMPLING PERCENT ≥ 1% AND POPULATION SIZES ≤ 50M

| CoV SKEWNESS | CoV < 0.8 | CoV ≥ 0.8 |
|---|---|---|
| SKEWNESS < 3.3 | JACKKNIFECLOSER | $\dfrac{\text{OPTIMAL} + \text{JACKKNIFECLOSER}}{2}$ |
| 3.3 ≤ SKEWNESS < 15 | JACKKNIFECLOSER | |
| SKEWNESS ≥ 15 | SCHLOSSERCLOSER | |

*FIG. 3B*

GENERATING A QUERY PLAN FOR ESTIMATING A NUMBER OF UNIQUE ATTRIBUTES IN A DATABASE

BACKGROUND

A database is a collection of information. A relational database is a database that is perceived by its users as a collection of tables. Each table arranges items and attributes of items in rows and columns respectively. Each table row corresponds to an item (also referred to as a record or tuple), and each table column corresponds to an attribute of the item (referred to as a field, and attribute type, or field type).

To retrieve information from a database, the user of a database system constructs a query. A query contains one or more operations that specify information to retrieve from the database. The system scans tables in the database to execute the query.

A database system often optimizes a query by arranging the order of query operations. The number of unique values for an attribute is one statistic that the database system uses to optimize queries. When the actual number of unique values is unknown, a database system can use an estimate of the number of unique attribute values. An accurate estimate of the number of unique values for an attribute is useful and methods for optimizing a query involving multiple join operations. The database system often uses the estimate in methods that determine the order in which to join tables. An accurate estimate of the number of unique values for an attribute is also useful in methods that reorder and group items. And estimate computed from a sample is typically used for large tables, rather than an exact count of the unique values, because computing the exact count is too time consuming for large tables.

Several types of estimators for estimating the number of unique values of an attribute in a database have been proposed in the database and statistics literature. The proposed estimators perform well depending on the degree of "skewness" in the data. The term skewness refers the variations in the frequencies of the attribute values. Uniform data, or data with "low skewness", has nonexistent or small variations.

It would thus be beneficial to have an estimator that provides relatively accurate estimates of the number of unique values of an attribute in a database, regardless of the skewness in the data.

BRIEF DESCRIPTION OF THE DRAWINGS

Features of the present invention will become apparent to those skilled in the art from the following description with reference to the figures, in which:

FIGS. 3A, 3B and 3C, respectively, show diagrams of various estimators and conditions under which a query optimizer module selects one or more of the various estimators, according to an embodiment of the invention.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are systems and methods for generating a query plan for estimating a number of unique entry counts of an attribute in a database. More particularly, the systems and methods disclosed herein implement a composite unique entry count estimator configured to estimate the number of unique entry counts of an attribute (either numeric or non-numeric values of attributes in a database table) from a relatively small sample of entries from a population of entries, such as, a specified column in a table. In addition, the composite unique entry count estimator includes a number of different estimators that are employed to estimate the count depending upon multiple ones of the skewness of the entries in the sample, the sampling percent of the sample, the coefficient of variance of the sample, and the total population size from which the sample is obtained.

Through implementation of the methods and systems disclosed herein, a query plan may be generate that accurately estimates the value of an attribute regardless of the skewness and/or variance of the data. In addition, the accurate estimates may be used to determine how the query should be executed such that the runtime execution for that query is substantially minimized.

Figure 1:
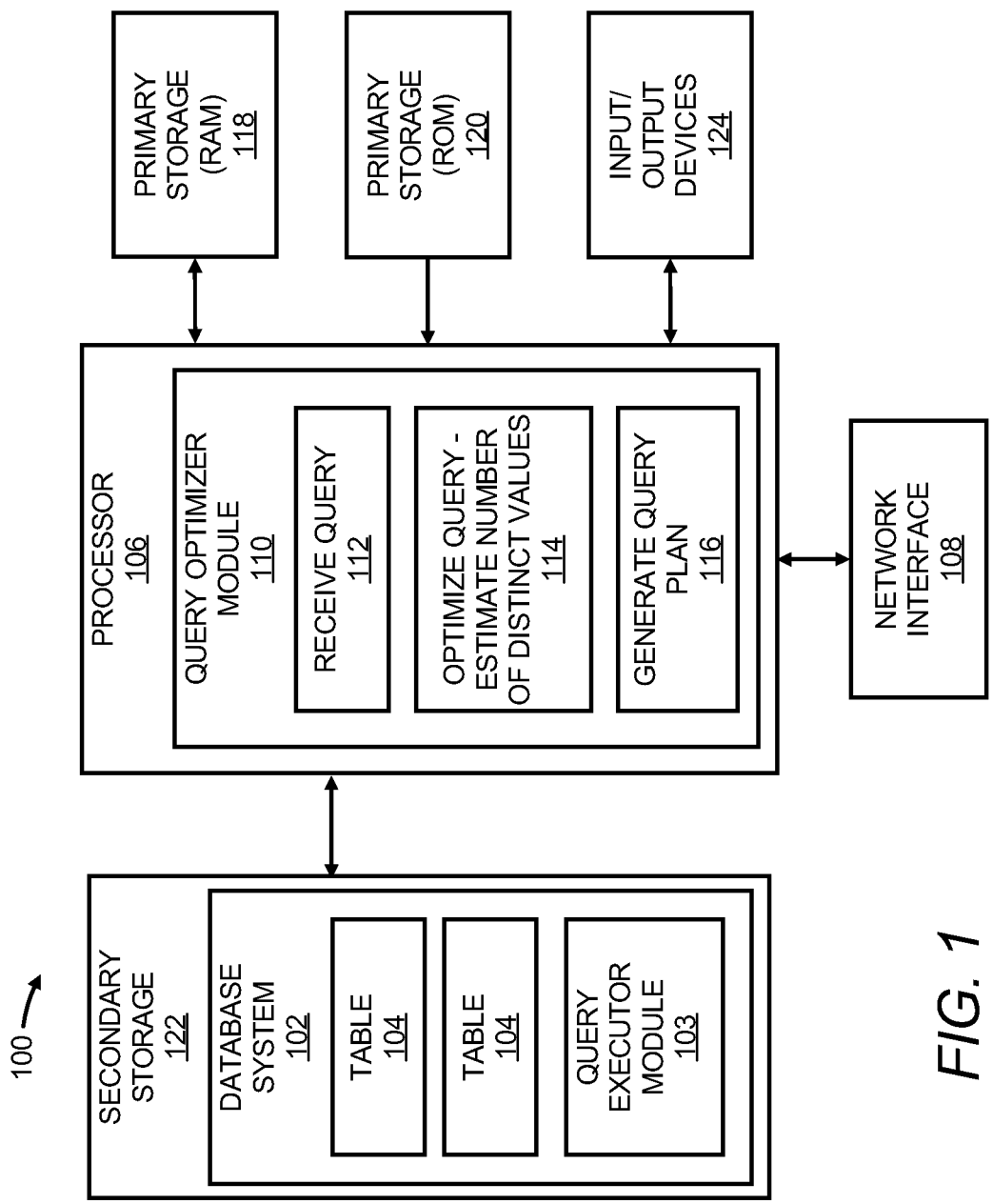
FIG. 1 depicts a simplified block diagram of a computer system that is a suitable platform for supporting a database system that includes one or more relational database tables, according to an embodiment of the invention.

With reference first to FIG. 1, there is shown a simplified block diagram of a computer system 100 that is a suitable platform for supporting a database system 102 that includes one or more relational database tables 104, according to an example. It should be understood that the computer system 100 may include additional components and that one or more of the components described herein may be removed and/or modified without departing from a scope of the computer system 100.

The computer system 100 may be implemented in a variety of configurations, such as servers, personal computers, hand-held devices, multi-processor systems, microprocessor-based or programmable consumer electronics, network PCs, network adapters, minicomputers, mainframe computers and the like. Embodiments of the invention may also be practiced in distributed computing environments, where tasks are performed by remote processing devices that are linked through a network interface 108. In a distributed computing environment, program modules may be located in both local and remote memory storage devices. Additionally, some embodiments may be implemented as logic instructions and distributed on tangible computer readable media.

As shown in FIG. 1, the computer system 100 includes a processor 106, a primary storage (RAM) 118, a primary storage (ROM) 120, and input/output devices 124. The computer system 100 may also include a secondary storage device 122, which may be coupled to the processor 106 for bidirectional communication therebetween. According to an example, the database system 102 including tables 104, which may be stored in the secondary storage device 122. In addition, the tables 104 may each include a series of entries. A database initially includes a set of relational tables called system catalogs that define the tables 104. The catalogs also store statistics, for example, the number of unique values of an attribute for entries in the tables 104.

Although a single processor 106 is depicted in FIG. 1, the computer system 100 may include one or more additional processors 106. In addition, or alternatively, multiple processors 106 may be coupled to communicate with one another in a local or wide area network via the network interface 108.

The processor 106 is depicted as including a query optimizer module 110 configured to optimize queries to increase the speed in which information is processed in the database tables 104. In operation, after the query optimizer module 110 receives a query in sub-process 112, sub-process 114 optimizes the query, and sub-process 116 generates a query plan. One of the parameters used to optimize a query is the number of unique values for an attribute in a table 104. A query optimization process may use the exact number of unique values for a given attribute or the query optimization process may obtain an estimate of the number of unique values for an attribute. Disclosed herein below are various manners in which the number of unique values may be estimated. After generating the query plan, the query plan is communicated to a query executor module 103 of the database system 102, which executes the query plan.

According to an example, the processor 106 may comprise a special-purpose device designed specifically to interface with the database system 102. In this example, the processor 106 may be coupled to communicate with a central processing unit (not shown) that performs other functions and coordinates activities of associated processors, such as the processor 106.

The computer system 100 may include any number of memory devices including the RAM and ROM primary storage devices 118, 120. ROM acts to transfer data and instructions uni-directionally to the processor 106, while RAM is used typically to transfer data and instructions in a bidirectional manner. A specific primary storage device 120 such as a CD-ROM may also pass data uni-directionally to the processor 106.

The processor 106 may also be coupled to one or more input/output devices 124 that may include, but are not limited to, devices such as video monitors, trackballs, mice, keyboards, microphones, touch-sensitive displays, transducer card readers, magnetic or paper tape readers, tablets, styluses, voice or handwriting recognition systems, and/or other suitable types of devices.

The query optimizer module 110 may comprise software, firmware, or hardware configured to optimize queries to increase the speed in which information is processed in the database tables 104. In instances where the query optimizer module 110 comprises software, the query optimizer module 110 may be stored on a computer readable storage medium and may be executed by the processor 106. In instances where the query optimizer module 110 comprises firmware or hardware, the query optimizer module 110 may comprise a circuit or other apparatus configured to perform the functions described herein.

Figure 2:
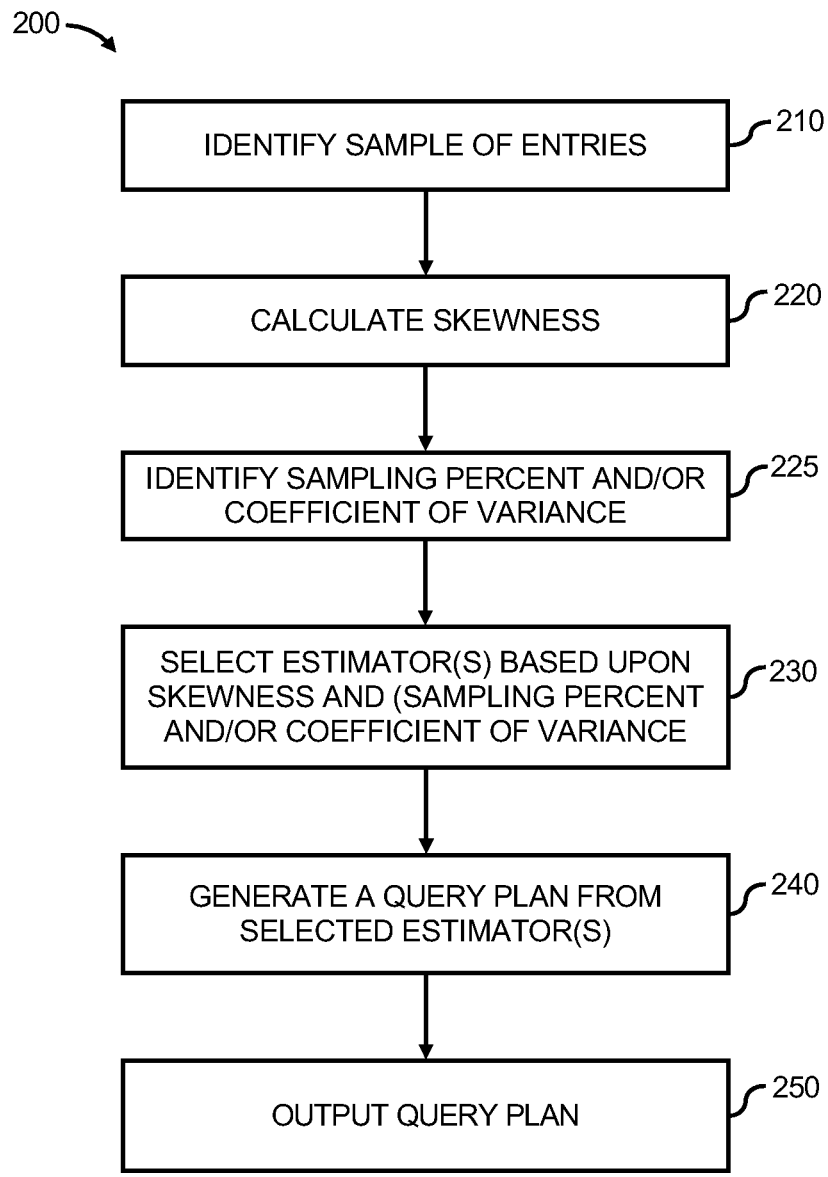
FIG. 2 shows a flow diagram of a method for generating a query plan for estimating a number of unique entry counts of an attribute in a database, according to an embodiment of the invention.

Turning now to FIG. 2, there is shown a flow diagram of a method 200 for generating a query plan for estimating a number of unique entry counts of an attribute in a database, according to an example. It should be understood that the method 200 may include additional steps and that one or more of the steps described herein may be removed and/or modified without departing from a scope of the method 200.

The description of the method 200 is made with reference to the computer system 100 depicted in FIG. 1 and thus makes particular reference to the elements contained in the environment 100. More particularly, the method 200 relates to the sub-process 114 for estimating the number of distinct values for an attribute. It should, however, be understood that the method 200 may be implemented in an environment that differs from the computer system 100 without departing from a scope of the method 200.

Generally speaking, the query optimizer module 110 may implement the method 200 to generate a query plan for estimating a number of unique entry counts (UECs) of an attribute in a database. The query optimizer module 110 may output the query plan to the query executor module 103, which may implement the query plan to optimize a query into the database.

With particular reference again to FIG. 2, at step 210, the query optimizer module 110 identifies a sample of entries from a table 104. The query optimizer may also receive information pertaining to the population size of the entries in the table 104. According to an example, the database system 102 collects the samples at a pre-set time interval or upon demand and communicates the samples to the query optimizer module 110. The number of samples or the percentage of the total population of entries that the samples make up may also be identified at step 210. The database system 102 may be configured to obtain a predetermined sampling percent or may be controlled to vary the sampling percent of the total population on a query by query basis.

At step 220, the query optimizer module 110 calculates the skewness of the entries contained in the data sample. The skewness of the entries comprises the third order normalized centralized moment of the entries, and may be calculated through the following equation:

$$\text{skewness} = \frac{1}{ns^3} \sum_{i=1}^{n} (x_i - \bar{x})^3. \qquad \text{Equation (1)}$$

In Equation (1), $\bar{x}$ and s are the mean and standard deviation of the $N_i$'s (the number of times the ith item occurs) computed from the values of the entries in the sample, respectively, x represents the values of the entries, and n is the total number of entries in the sample. The third moment computed from the distribution of $N_i$'s is the skewness.

At step 225, the query optimizer module 110 identifies at least one of the sampling percent and a coefficient of variance of the entries contained in the sample identified at step 210. The sampling percent may comprise the percentage of entries contained in the sample with respect to the population size of the table 104. The coefficient of variance may comprise a normalized measure of dispersion of a probability distribution and may be defined as the ratio of the standard deviation (s) to the mean ($\bar{x}$).

At step 230, the query optimizer module 110 selects at least one estimator of a plurality of estimators based upon the calculated skewness of the entries and at least one of the sampling percent and the coefficient of variance of the entries contained in the sample identified at step 225. More particularly, the query optimizer module 110 is configured to select from a variety of different estimators (and estimator combinations) based upon the population size, sampling percent, and/or the skewness of the sample entries, for instance as shown in the diagrams 300 and 320 in FIGS. 3A and 3B and the flow diagram 350 in FIG. 3C. The accuracy of the estimators (and combinations thereof) may depend upon the skewness of the entries. For example, the Jackknife family of estimators provides good estimates with data having low skewness but not high skewness. In contrast, the Schlosser family of estimators provides good estimates when the data has high skewness, but not low skewness. As shown in the diagrams 300 and 320, accurate estimates of the distinct values of an attribute may automatically be determined regardless of the skewness of the data through use of the various types and combinations of estimators described therein.

The diagrams 300 and 320, more particularly, depict the various estimators and estimator combinations that the query optimizer module 110 may select from at step 230, as well as conditions under which the query optimizer module 110 selects each of the various estimators. The flow diagram 350 depicts a manner in which the query optimizer module 110 may operate in selecting one or more estimators at step 230. The query optimizer module 110 is configured to implement one of the diagrams 300, 320, and 350 based upon the population size and the sampling percent of the of the sample entries. By way of example, the query optimizer module 110 is configured to implement the diagram 300 for population sizes greater than about 50 million, the diagram 320 for population sizes less than or equal to about 50 million and for sampling percents greater than or equal to about 1%, and the diagram 350 when the sampling percent equals about 0.01%. Although specific values for the sampling percent and the population sizes have been presented herein, it should be understood that the query optimizer module 110 may use other criteria, such as, other sampling percent and population sizes, in determining which of the diagrams 300, 320, and 350 to implement in selecting the one or more estimators.

As shown in the diagram 300, there are four singular estimators and two composite estimators. The singular estimators are labeled as optimal, JackknifeCloser, adaptive, and SchlosserCloser. The composite estimators are combinations of the optimal and JackknifeCloser estimators and the optimal and adaptive estimators. As shown in the diagram 320, there are two singular estimators and one composite estimator. The singular estimators are labeled as JackknifeCloser and SchlosserCloser and the composite estimator is labeled as a combination of the optimal and the JackknifeCloser estimators. As shown in the flow diagram 350, the query optimizer module 110 is configured to select from among the optimal, the JackknifeCloser, and a geometric mean of the optimal and JackknifeCloser estimators based upon the satisfaction of various conditions. In the diagrams 300, 320, and 350, the composite estimators may comprise linear combinations of the various estimators.

The JackknifeCloser estimator represents estimators in the Jackknife family of estimators that yields estimates that are the closest to the optimal estimator estimates. Likewise, the SchlosserCloser estimator represents estimators in the Schlosser family of estimators that yields estimates that are the closest to the optimal estimator estimates.

In the following equations that define the various estimators that may be employed in the diagrams 300, 320 and 350, the following conventions are used:

D represents the actual number of unique values of an attribute in a database;
q is the sampling fraction (so a 1% sample would have q=0.01);
$f_i$ is the number of classes that occur exactly i times in the sample;
$d_n$ is the number of distinct values in the sample;
n is the sample size; N is the size of the population, for instance, a column in a table 104;
e is the exponential and has an approximate value of 2.1783;
i indexes the number of occurrences of a value of an attribute; and m is the number of values of an attribute that occurs a few times (such as, once or twice, f1, f2) in the population.

The Jackknife family of estimators ($\hat{D}_{uji}$) includes a first order unsmoothed Jackknife estimator defined by the following equation:

$$\hat{D}_{uj1} = \left(1 - \frac{f_1(1-q)}{n}\right)^{-1} d_n. \qquad \text{Equation (2)}$$

The Jackknife family of estimators also includes a second order unsmoothed Jackknife estimator defined by the following equation:

$$\hat{D}_{uj2} = \left(1 - \frac{f_1(1-q)}{n}\right)^{-1}\left(d_n - \frac{f_1(1-q)\ln(1-q)\hat{y}^2(\hat{D}_{uj1})}{q}\right), \qquad \text{Equation (3)}$$

where $$\hat{y}^2(D_{(true)}) = \text{Max}\left(0, \frac{D_{(true)}}{n^2}\sum_{i=1}^{n} i(i-1)f_i + \frac{D_{(true)}}{N} - 1\right).$$

The Schlosser family of estimators ($\hat{D}_{(shloss)}$) includes a first order Schlosser estimator defined by the following equation:

$$\hat{D}_{(shloss)} = d + \frac{f_1 \sum_{i=1}^{n}(1-q)^i f_i}{\sum_{i=1}^{n} iq(1-q)^{i-1} f_i}. \qquad \text{Equation (4)}$$

The Schlosser family of estimators also includes a third order Schlosser estimator defined by the following equation:

$$\hat{D}_{Sh3} = \qquad \text{Equation (5)}$$

$$d_n + f_1 \left(\frac{\sum_{i=1}^{n} iq^2(1-q^2)^{i-1} f_i}{\sum_{i=1}^{n}(1-q)^{i-1}[(1+q)^i - 1] f_i}\right)\left(\frac{\sum_{i=1}^{n}(1-q)^i f_i}{\sum_{i=1}^{n} iq(1-q)^{i-1} f_i}\right)^2.$$

The optimal estimator ($\hat{D}_{Opt}$) is defined by the following equation:

$$\hat{D}_{Opt} = \sqrt{N/n}\, f_1 + \sum_{i=2}^{n} f_i. \qquad \text{Equation (6)}$$

The adaptive estimator is defined by the following equation:

$\hat{D}_{ATE} = d + m - f_1 - f_2$, where $d = \Sigma f_i$ and where m is the solution to the following equation:  Equation (7)

$$m - f_1 - f_2 = f_1 \left(\frac{\sum_{i=3}^{r} e^{-i} f_i + m e^{-(f_1 + 2f_2)/m}}{\sum_{i=3}^{r} i e^{-i} f_i + (f_1 + 2f_2) e^{-(f_1 + 2f_2)/m}}\right). \qquad \text{Equation (8)}$$

Figure 3C:
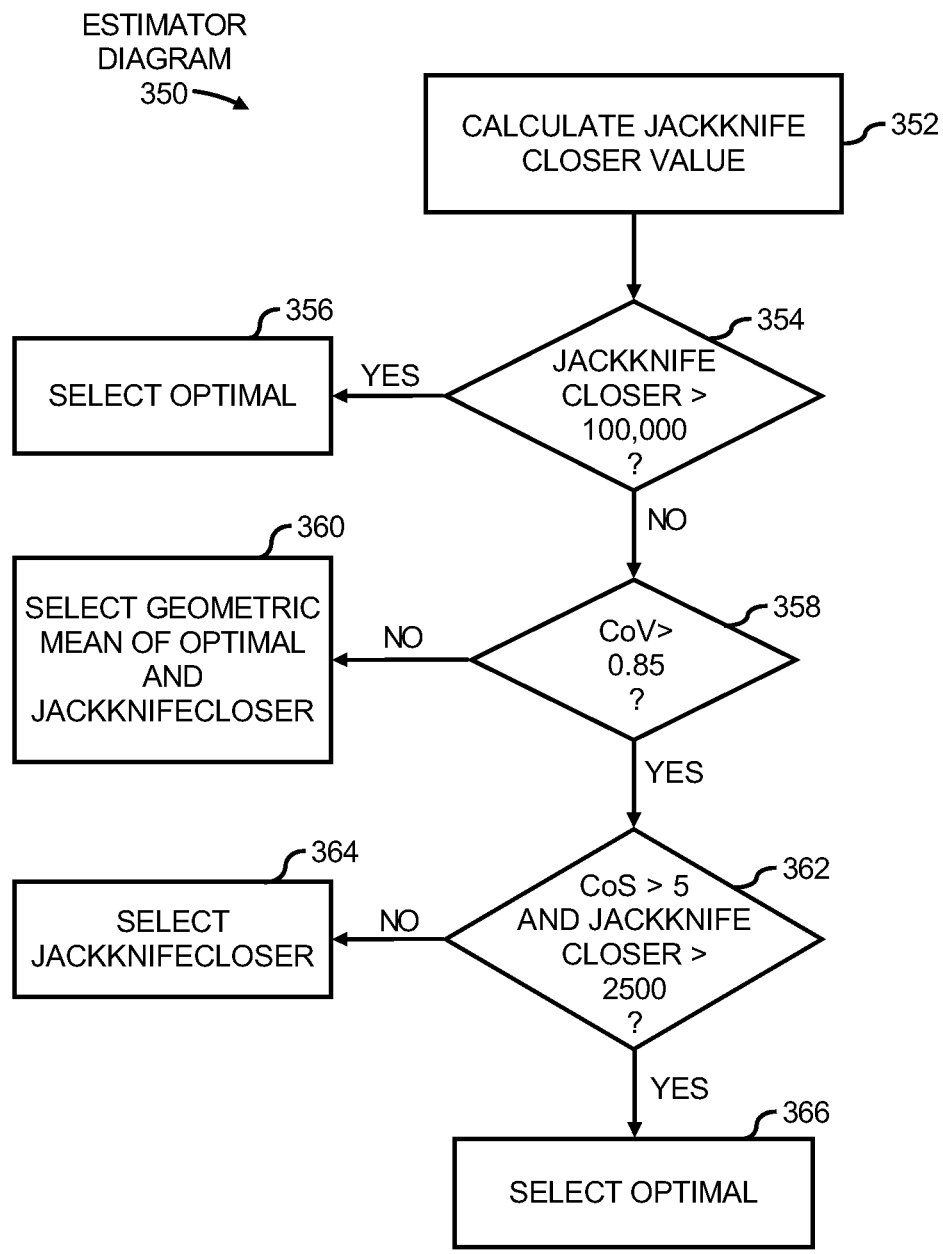

With reference back to the diagrams 300, 320, and 350 in FIGS. 3A-3C, there are shown various conditions that determine which of the estimator(s) the query optimizer module 110 selects at step 230. More particularly, the query optimizer module 110 is configured to select from the set of estimators depicted in the diagram 300 (FIG. 3A) when the population size is greater than 50 million. As shown in the diagram 300, the query optimizer module 110 is further configured to select from a first set of estimators when the sampling percent is below 0.9% and another set of estimators when the sampling percent is equal to or exceeds 0.9%.

The query optimizer module 110 is configured to select from the set of estimators depicted in the diagram 320 (FIG. 3B) when the population size is less than or equal to 50 million and the sampling percent is greater than 1%. As shown in the diagram 320, the query optimizer module 110 is configured to select from a first set of estimators when a coefficient of variance (CoV), which comprises a second order moment, falls below 0.8 and a second set of estimators when the coefficient of variance (CoV) equals or exceeds 0.8. As further depicted in both of the diagrams 300, 320, the query optimizer module 110 is configured to select from the sets of estimators based upon the skewness calculated at step 220.

As shown in the diagram 300, regardless of the sampling percent value, when the skewness is below 4, the query optimizer module 110 selects a linear combination of the optimal estimator and the JackknifeCloser estimator. More particularly, the query optimizer module 110 selects an average of the estimates calculated through the optimal estimator and the JackknifeCloser estimator.

As further shown in the diagram 300, when the sampling percent is below 0.9% and the skewness is equal to or exceeds 4 and is below 30, the query optimizer module 110 selects the optimal estimator. In addition, when the sampling percent is below 0.9% and the skewness is equal to or exceeds 30, the query optimizer module 110 selects a linear combination of the optimal estimator and the adaptive estimator. More particularly, for instance, the query optimizer module 110 selects an average of the estimates calculated through the optimal estimator and the adaptive estimator.

As still further shown in the diagram 300, when the sampling percent is equal to or exceeds 0.9% and the skewness is equal to or exceeds 4 and is below 13, the query optimizer module 110 selects the optimal estimator. In addition, when the sample percent is equal to or exceeds 0.9% and the skewness equals or exceeds 13, the query optimizer module 110 selects the SchlosserCloser estimator.

As shown in the diagram 320, when the skewness falls below 3.3 and the coefficient of variance (CoV) falls below 0.8, the query optimizer module 110 selects the JackknifeCloser estimator. When the skewness falls below 3.3 and the CoV equals or exceeds 0.8, the query optimizer module 110 selects a linear combination of the optimal estimator and the JackknifeCloser estimator. More particularly, for instance, the query optimizer module 110 selects an average of the estimates calculated through the optimal estimator and the JackknifeCloser estimator. When the skewness falls between 3.3 and 15, regardless of the CoV, the query optimizer module 110 selects the JackknifeCloser estimator. In addition, when the skewness equals or exceeds 15, regardless of the CoV, the query optimizer module 110 selects the SchlosserCloser estimator.

As shown in the flow diagram 350, when the sampling percent is equal to approximately 0.01%, the query optimizer module 110 calculates the JackknifeCloser value, as indicated at step 352. At step 354, the query optimizer module 110 determines whether the JackknifeCloser value exceeds 100,000. If the JackknifeCloser value exceeds 100,000, the query optimizer module 110 selects the optimal estimator, as indicated at step 356. However, if the JackknifeCloser value falls below 100,000, the query optimizer module 110 determines whether the CoV exceeds 0.85, as indicated at step 358. If the CoV falls below 0.85, the query optimizer module 110 selects a geometric mean (GM) of the optimal estimator and the JackknifeCloser estimator at step 360, which may be represented as:

$$GM=\sqrt{optimal*jackknifecloser}.\qquad\qquad\text{Equation (9)}$$

If, however, the CoV exceeds 0.85, the query optimizer determines whether the coefficient of skewness (CoS) exceeds 5 and whether the JackknifeCloser exceeds 2500, as indicated at step 362. If either of these conditions is not true, the query optimizer module 110 selects the JackknifeCloser estimator, as indicated at step 364. However, if both of these conditions is true, then the query optimizer module 110 selects the optimal estimator, as indicated at step 366.

At step 240, the query optimizer module 110 generates a query plan for estimating the number of unique entry counts of an attribute in the table 104 from the one or more estimators selected at step 230. In generating the query plan, the query optimizer module 110 is configured to use the derived estimator on both numeric and non-numeric values of attributes in a database table.

At step 250, the query optimizer module 110 utilizes the number of unique entry counts, together with other histogram related statistics, such as, within-bin row counts, bin boundary values, etc., at compile time to generate an optimal query plan. The query executor module 103 uses the query plan produced by the query optimizer module 110 in producing the desired results to the end-user query. In one regard, the histogram and the unique entry counts comprise statistics that the query optimizer module 110 uses for generating the query plans, which are often alluded to as data synopses.

Some or all of the operations set forth in the method 200 may be contained as one or more utilities, programs, or subprograms, in any desired computer accessible or readable medium. In addition, the method 200 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices.

Exemplary computer readable storage devices include conventional computer system RAM, ROM, EPROM, EEPROM, and magnetic or optical disks or tapes. It is therefore to be understood that any electronic device capable of executing the above-described functions may perform those functions enumerated above.

Although not specifically shown, Monte Carlo simulations over a variety of statistical distributions using the methods and systems disclosed herein resulted in consistently higher precision on average for any given sampling percentages under various skewness conditions than the estimators considered alone.

The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules may be independently implemented or included in one of the other system components. Similarly, other components are disclosed herein as separate and discreet components. These components may, however, be combined to form larger or different software modules, integrated circuits, or electrical assemblies, if desired.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for generating a query plan for estimating a number of unique entry counts of an attribute in a database, said method comprising:
   identifying a sample of entries in the database;
   calculating a skewness of the entries in the sample;
   identifying, by a processor, a sampling percent of the sample;
   selecting at least one of a plurality of estimators based upon the calculated skewness of the entries and based upon whether the sampling percent of the sample is equal to or exceeds a predetermined percentage value; and
   generating a query plan from the selected at least one of the plurality of estimators, wherein the query plan is to be implemented in estimating the number of unique entry counts of the attribute.

2. The method according to claim 1, further comprising:
   comparing the calculated skewness of the entries with a plurality of skewness values; and
   wherein selecting at least one of the plurality of estimators further comprises selecting at least one of the plurality of estimators based upon the comparison of the skewness of the entries with the plurality of skewness values.

3. The method according to claim 1, wherein the plurality of estimators comprise singular estimators and composite estimators, and wherein selecting at least one of a plurality of estimators further comprises selecting at least one of the singular estimators and the composite estimators based upon the skewness of the entries and based upon whether the sampling percent of the sample is equal to or exceeds the predetermined percentage value.

4. The method according to claim 3, wherein the plurality of singular estimators comprises an adaptive estimator, an optimal estimator, a JackknifeCloser estimator, and a SchlosserCloser estimator, and wherein the plurality of composite estimators comprises linear combinations of at least two of the singular estimators, wherein the Jackknife-Closer estimator comprises a Jackknife estimator from a family of Jackknife estimators that yields values that are closest to values estimated by the optimal estimator, and wherein SchlosserCloser estimator comprises a Schlosser estimator from a family of Schlosser estimators that yields values that are closest to values estimated by the optimal estimator.

5. The method according to claim 4, wherein selecting at least one of the plurality of estimators further comprises selecting a linear combination of the optimal estimator and the JackknifeCloser estimator in response to the skewness falling below a first skewness value.

6. The method according to claim 5, wherein selecting at least one of the plurality of estimators further comprises selecting the optimal estimator in response to the skewness exceeding the first skewness value and falling below a second skewness value.

7. The method according to claim 6, wherein selecting at least one of the plurality of estimators further comprises selecting a linear combination of the optimal estimator and the adaptive estimator in response to the skewness exceeding a third skewness value and falling below a first sampling percent wherein the third skewness value exceeds the first and second skewness values.

8. The method according to claim 6, wherein selecting at least one of the plurality of estimators further comprises selecting the SchlosserCloser estimator in response to the skewness exceeding the second skewness value and equaling or exceeding a second sampling percent, wherein the second sampling percent is higher than the first sampling percent.

9. The method according to claim 1, further comprising:
   optimizing a query of a database through implementation of the generated query plan.

10. A query optimizer comprising:
    a memory storing logic instructions to:
       identify a sample of entries in a database;
       calculate a skewness of the entries in the sample;
       identify a sampling percent of the sample;
       select at least one of a plurality of estimators based upon the calculated skewness of the entries and based upon whether the sampling percent of the sample is equal to or exceeds a predetermined percentage value; and
       generate a query plan from the selected at least one of the plurality of estimators, wherein the query plan is to be implemented to estimate the number of unique entry counts of the attribute; and
    a processor to implement the logic instructions.

11. The query optimizer according to claim 10, further comprising logic instructions to:
    compare the calculated skewness of the entries with a plurality of skewness values; and
    select at least one of the plurality of estimators based upon whether the sampling percent of the sample is equal to or exceeds the predetermined percentage value and a coefficient of variance of the sample is equal to or exceeds a predefined value, and based upon the comparison of the skewness of the entries with the plurality of skewness values.

12. The query optimizer according to claim 10, wherein the plurality of estimators comprises an adaptive estimator, an optimal estimator, a JackknifeCloser estimator, and a SchlosserCloser estimator, and linear combinations of at least two of the singular estimators, wherein the Jackknife-Closer estimator comprises a Jackknife estimator from a family of Jackknife estimators that yields values that are closest to values estimated by the optimal estimator, and wherein SchlosserCloser estimator comprises a Schlosser estimator from a family of Schlosser estimators that yields values that are closest to values estimated by the optimal estimator.

13. The query optimizer according to claim 12, further comprising logic instructions to:
    select a linear combination of the optimal estimator and the JackknifeCloser estimator in response to the skewness falling below a first skewness value;

select the optimal estimator in response to the skewness exceeding the first skewness value and falling below a second skewness value;

select a linear combination of the optimal estimator and the adaptive estimator in response to the skewness exceeding a third skewness value and falling below a first sampling percent wherein the third skewness value exceeds the first and second skewness values; and select the SchlosserCloser estimator in response to the skewness exceeding the second skewness value and equaling or exceeding a second sampling percent, wherein the second sampling percent is higher than the first sampling percent.

14. A non-transitory computer readable storage medium on which is embedded one or more computer programs, said one or more computer programs implementing a method for generating a query plan for estimating a number of unique entry counts of an attribute in a database, said one or more computer programs comprising computer readable code to:

identify a sample of entries in the database;
calculate a skewness of the entries in the sample;
identify a sampling percent of the sample;
select at least one of a plurality of estimators based upon the calculated skewness of the entries and based upon whether the sampling percent of the sample is equal to or exceeds a predetermined percentage value; and generate a query plan from the selected at least one of the plurality of estimators, wherein the query plan is to be implemented in estimating the number of unique entry counts of the attribute.

15. The computer readable storage medium according to claim 14, wherein the plurality of estimators comprises an adaptive estimator, an optimal estimator, a JackknifeCloser estimator, and a SchlosserCloser estimator, and linear combinations of at least two of the estimators, wherein the JackknifeCloser estimator comprises a Jackknife estimator from a family of Jackknife estimators that yields values that are closest to values estimated by the optimal estimator, and wherein SchlosserCloser estimator comprises a Schlosser estimator from a family of Schlosser estimators that yields values that are closest to values estimated by the optimal estimator.

* * * * *